US009378179B2

(12) United States Patent
Guerin et al.

(10) Patent No.: US 9,378,179 B2
(45) Date of Patent: Jun. 28, 2016

(54) RDMA-OPTIMIZED HIGH-PERFORMANCE DISTRIBUTED CACHE

(71) Applicant: INTERNATIONAL BUSINESS MACHINES CORPORATION, Armonk, NY (US)

(72) Inventors: Xavier R. Guerin, White Plains, NY (US); Tiia J. Salo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 13/683,319

(22) Filed: Nov. 21, 2012

(65) Prior Publication Data
US 2014/0143364 A1    May 22, 2014

(51) Int. Cl.
*H04L 9/08* (2006.01)
*H04L 29/08* (2006.01)
*G06F 15/173* (2006.01)
*G06F 17/30* (2006.01)

(52) U.S. Cl.
CPC ...... *G06F 15/17331* (2013.01); *G06F 17/3033* (2013.01); *H04L 9/08* (2013.01); *H04L 67/1097* (2013.01); *H04L 69/324* (2013.01)

(58) Field of Classification Search
CPC .............. H04L 9/0891–9/3271; H04L 69/324; H04L 67/1097; G06F 17/3033
USPC ............. 709/201–253; 711/100–221; 710/22, 710/23; 707/600–831
See application file for complete search history.

(56) References Cited

U.S. PATENT DOCUMENTS

| 7,797,393 | B2 * | 9/2010 | Qiu et al. ........................ 709/213 |
| 8,046,425 | B1 * | 10/2011 | Gopalan et al. ................ 709/216 |
| 8,793,467 | B2 * | 7/2014 | Colgrove .............. G06F 3/0608 711/206 |
| 9,075,710 | B2 * | 7/2015 | Talagala .............. G06F 12/0246 |
| 2004/0010612 | A1 | 1/2004 | Pandya |
| 2010/0082766 | A1 | 4/2010 | Dreier |
| 2011/0022801 | A1 * | 1/2011 | Flynn ............................ 711/120 |
| 2012/0210095 | A1 * | 8/2012 | Nellans et al. ................ 711/206 |

OTHER PUBLICATIONS

IPCOM000196714D; "High Performance Cache With LRU Replacement Policy"; http://priorartdatabase.com/IPCOM/196714; Jun. 12, 2010.
Oliver, JK.; "Cache Hash Overflow Table for Computers Using Cache Memory"; http://www.ip.com/pubview/IPCOM000035915D; Jan. 28, 2005.

* cited by examiner

*Primary Examiner* — Patrice Winder
*Assistant Examiner* — Angela Widhalm De Rodriguez
(74) *Attorney, Agent, or Firm* — Gates & Cooper LLP

(57) ABSTRACT

For remote direct memory access (RDMA) by a client to a data record stored in a cache on a server, a hash map is received by a client from a server. The hash map includes one or more entries associated with a key for the data record stored in the cache on the server that stores a server-side remote pointer referencing the data record stored in the cache on the server. The client, using the key, looks up the server-side remote pointer for the data record from the hash map, and then performs one or more RDMA operations using the server-side remote pointer that allow the client to directly access the data record stored in the cache on the server.

12 Claims, 9 Drawing Sheets

RDMA-OPTIMIZED HIGH-PERFORMANCE DISTRIBUTED CACHE

BACKGROUND OF THE INVENTION

1. Field of the Invention

This invention relates in general to database management systems performed by computers, and in particular, to an RDMA-optimized high performance distributed cache.

2. Description of Related Art

Today's customer demand for instant responsiveness drives applications to exploit various caching schemes. Small-scale applications can rely on local caching and replication. However, when scaling out Internet applications, and the use of clouds, where server-affinity across requests cannot be guaranteed and the data volumes involved are massive, local caching cannot be used anymore. Instead, systems have to rely on partitioned and distributed caches (e.g. WebSphere Extreme Scale™ or Oracle Coherence™) that have to be accessed remotely.

A conventional key-value cache architecture is such that the client sends a request for data to a server over a network passing a key as a parameter. The server performs a key lookup (usually hash-based) in its cache for the associated value-object, e.g., a handle for or pointer to a data object. If found, the data object is serialized and returned to the client. Upon receiving the serialized data object, the client deserializes it and returns it to the requesting application.

SUMMARY OF THE INVENTION

According to one or more embodiments of the present invention a method, apparatus, and article of manufacture is provided for remote direct memory access (RDMA) by a client to a data record stored in a cache on a server. A hash map is published from the server to the client, wherein the hash map includes one or more entries associated with a key for the data record stored in the cache on the server, each of the entries stores a server-side remote pointer, and the server-side remote pointer references the data record stored in the cache on the server. The client, using the key, looks up the server-side remote pointer for the data record from the hash map, and then performs one or more RDMA operations using the server-side remote pointer that allow the client to directly access the data record stored in the cache on the server.

BRIEF DESCRIPTION OF THE DRAWINGS

Referring now to the drawings in which like reference numbers represent corresponding parts throughout.

DETAILED DESCRIPTION OF THE INVENTION

Figure 1:
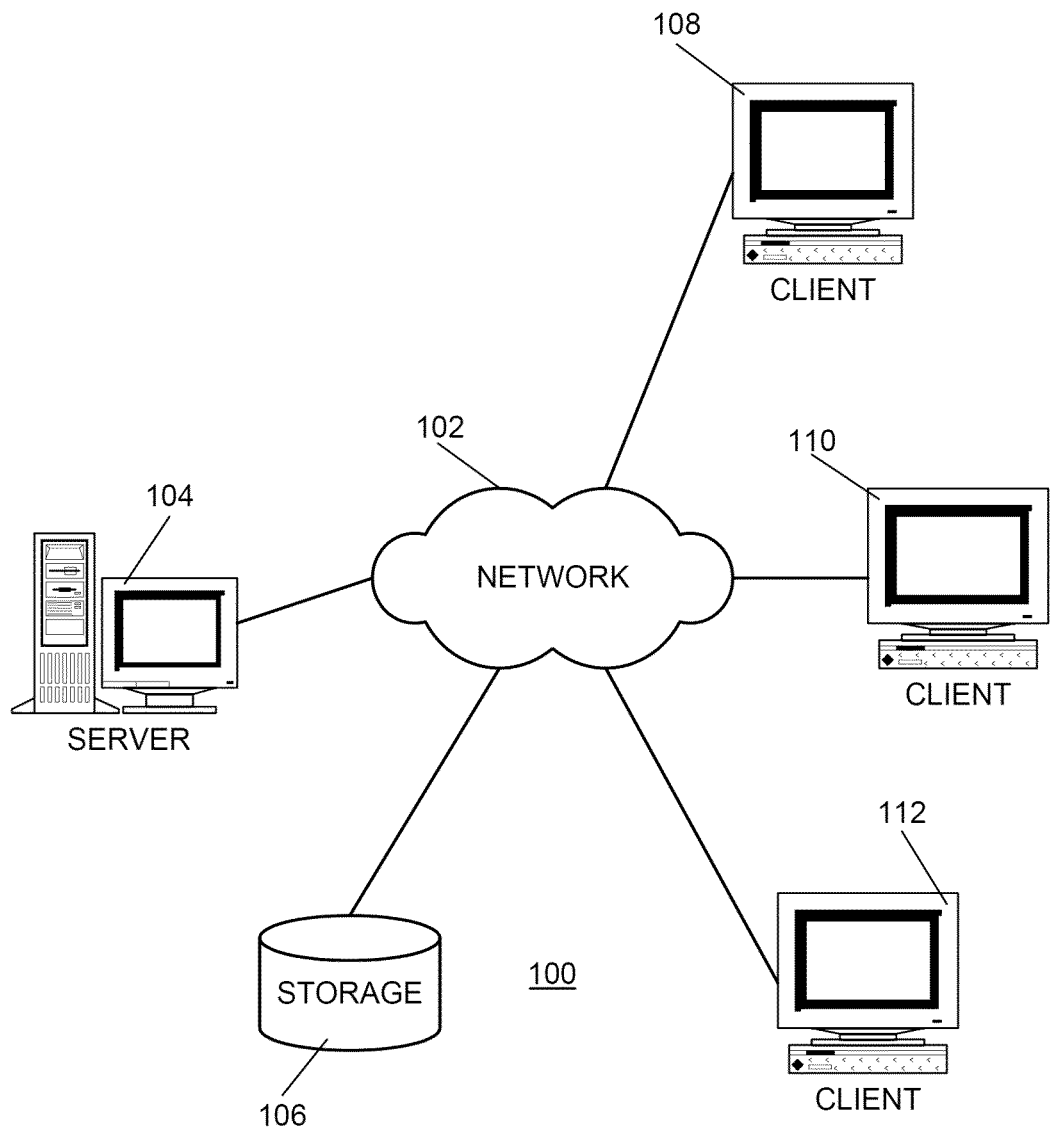
FIG. 1 is a diagram illustrating an exemplary network data processing system that could be used to implement elements of at least one embodiment of the present invention.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The flow described in the above "Description of Related Art" has to pass through a TCP/IP stack at least four times, e.g., Client to Network Interface Controller (NIC), NIC to Server, Server to NIC, and NIC to Client. Moreover, the data object has to undergo a (de)serialization operation twice, and the data object gets copied multiple times as it flows through the numerous I/O stack layers. As a result, remote access may be as much as three orders of a magnitude slower than local access (i.e., hundreds of microseconds vs. nanoseconds). This either completely prevents scaling out the applications or makes the applications prohibitively slow.

Embodiments of the invention described herein include a re-architected, distributed key-value pair cache that is configured suitably for RDMA (Remote Direct Memory Access) communication, avoids the above described TCP/IP protocol stack issues, and reduces operating system involvement for data transfers. This results in extremely fast, key-based cache lookups over a network.

Instead of providing clients with a remote get/put interface to a cache stored on a server, the server publishes a hash map to the clients that contains key-value pairs made of the cache entries' keys paired to their remote RDMA pointers. The hash map allows a client to look up a cache entry's remote RDMA pointer locally using its key, and then access the cache entry on the server using the remote RDMA pointers in one-sided RDMA operations.

One-sided RDMA operations do not involve server-side software, because these operations are performed by an RDMA NIC, wherein the NIC performs a DMA operation directly to or from the server's memory, which results in very low server CPU utilization even under a heavy load. Specifically, read, update and delete operations can be implemented using one-sided RDMA operations, while create operations require some server-side software involvement, because create operations introduce new keys that need to be broadcasted to all clients.

Experimental results show that the RDMA-optimized cache embodiments of the present invention can be implemented at an Internet scale, and is capable of over one million requests per second throughput per individual server, as compared to less than 100,000 requests per second throughput per individual server for a conventional cache. Specifically, embodiments of the present invention offer near-local speed for remote access, with an average of 5 microseconds for get/put latency for the RDMA-optimized cache, as compared to milliseconds for get/put latency for a conventional cache.

As a result, the present invention can be used for faster page rendering for highly contextual and personalized applications, such as Retail, Travel, Banking, Information Services, etc. Embodiments of the present invention also can be used in faster real-time analytics for "Big Data" applications, such as Retail, Mobile, Credit Card, etc. In addition, embodiments of the present invention can be used for any data processing at Internet Scale messaging rates, such as high-speed data capture, on-the-fly data enrichment, etc.

Thus, the advantages presented by embodiments of this invention are substantial and almost disruptive in nature. The RDMA-optimized cache "leapfrogs" the performance of prior art techniques by increasing throughput and accelerating latency-critical customer scenarios that depend on access to distributed data.

Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
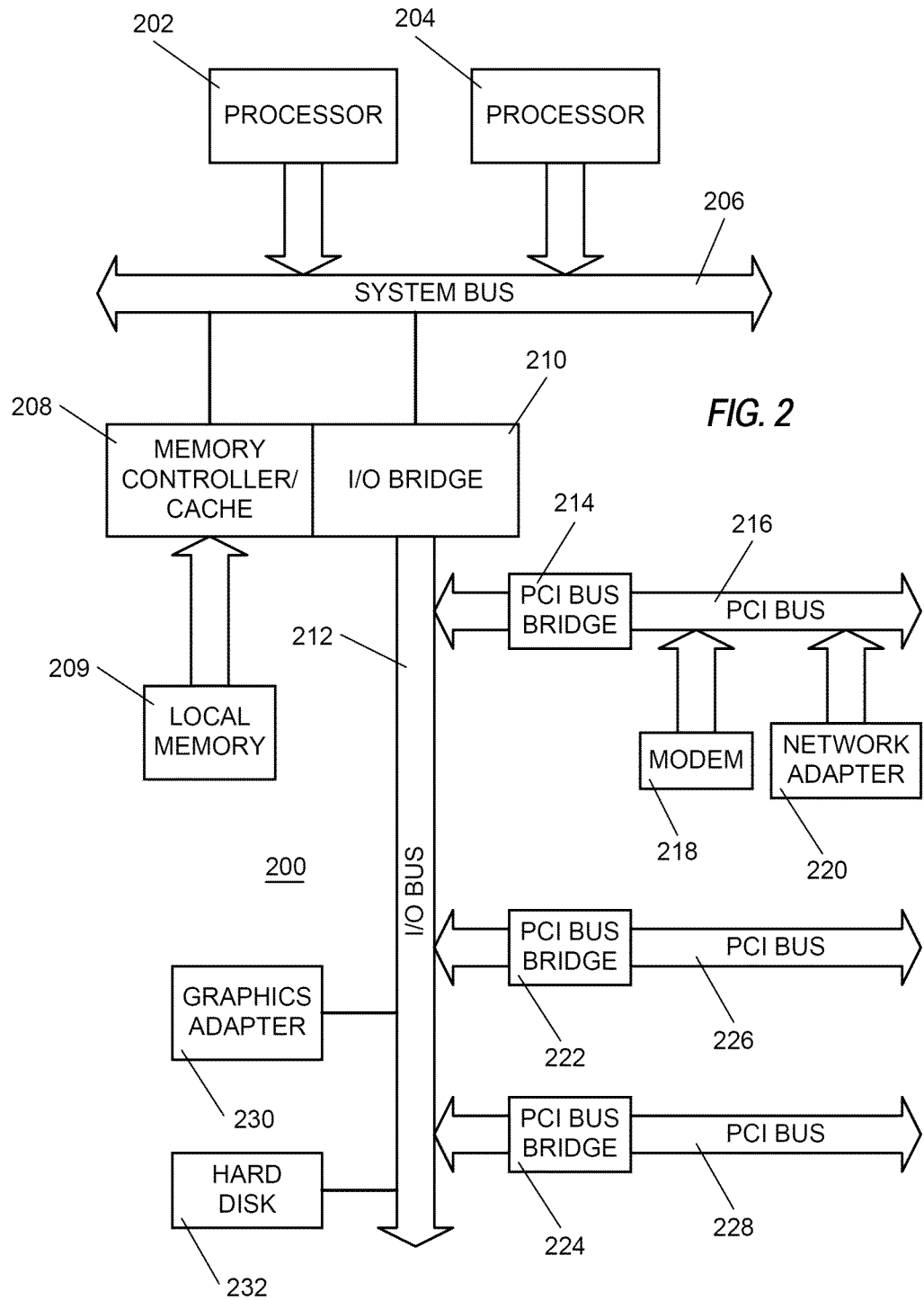
FIG. 2 is a diagram illustrating an exemplary data processing system that could be used to implement elements of at least one embodiment of the present invention.

Referring to FIG. 2, a block diagram of a data processing system that may be implemented as a server, such as Server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
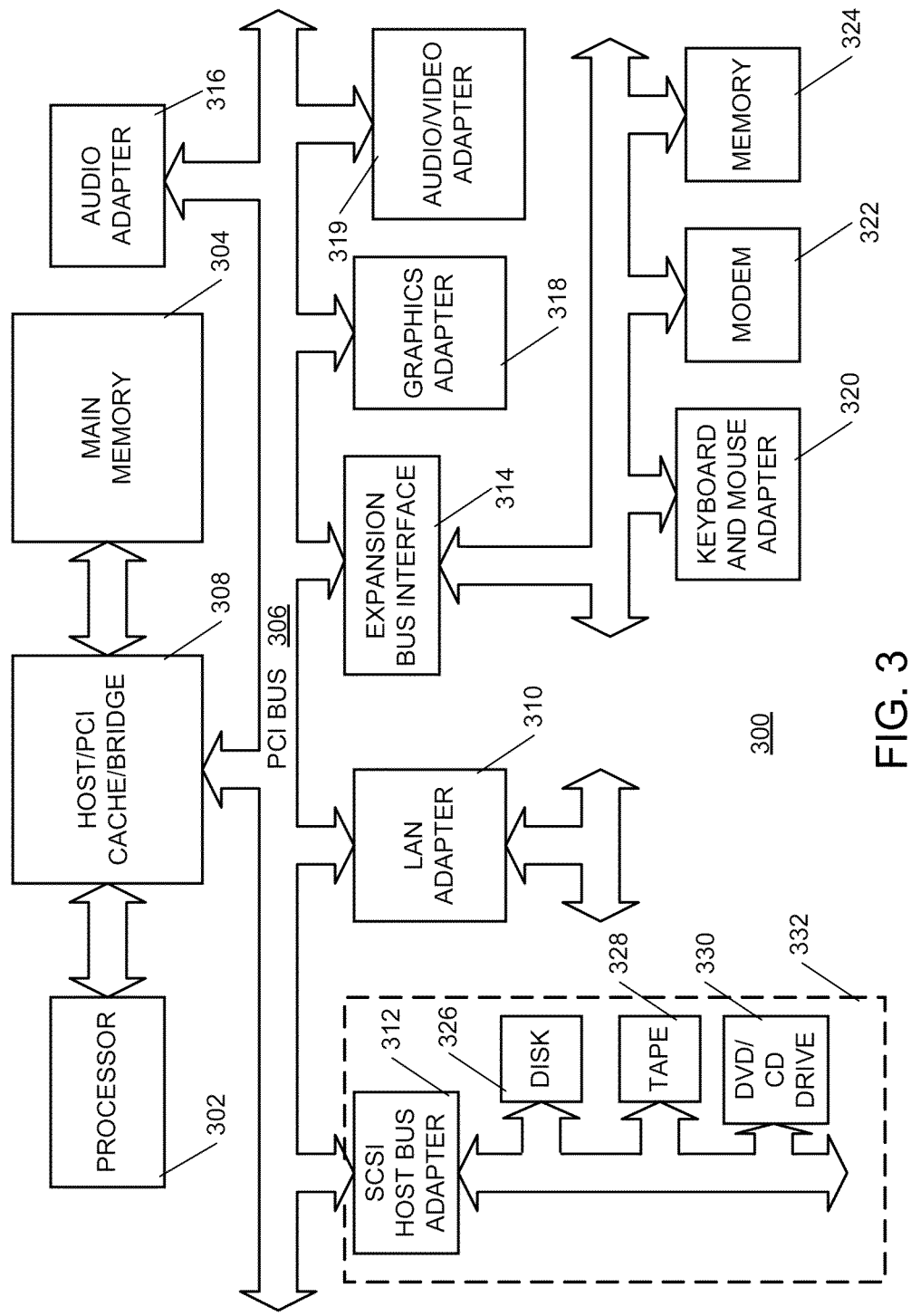
FIG. 3 is a diagram illustrating an exemplary data processing system that could be used to implement elements of at least one embodiment of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

RDMA-Optimized Caching

Figure 4A:
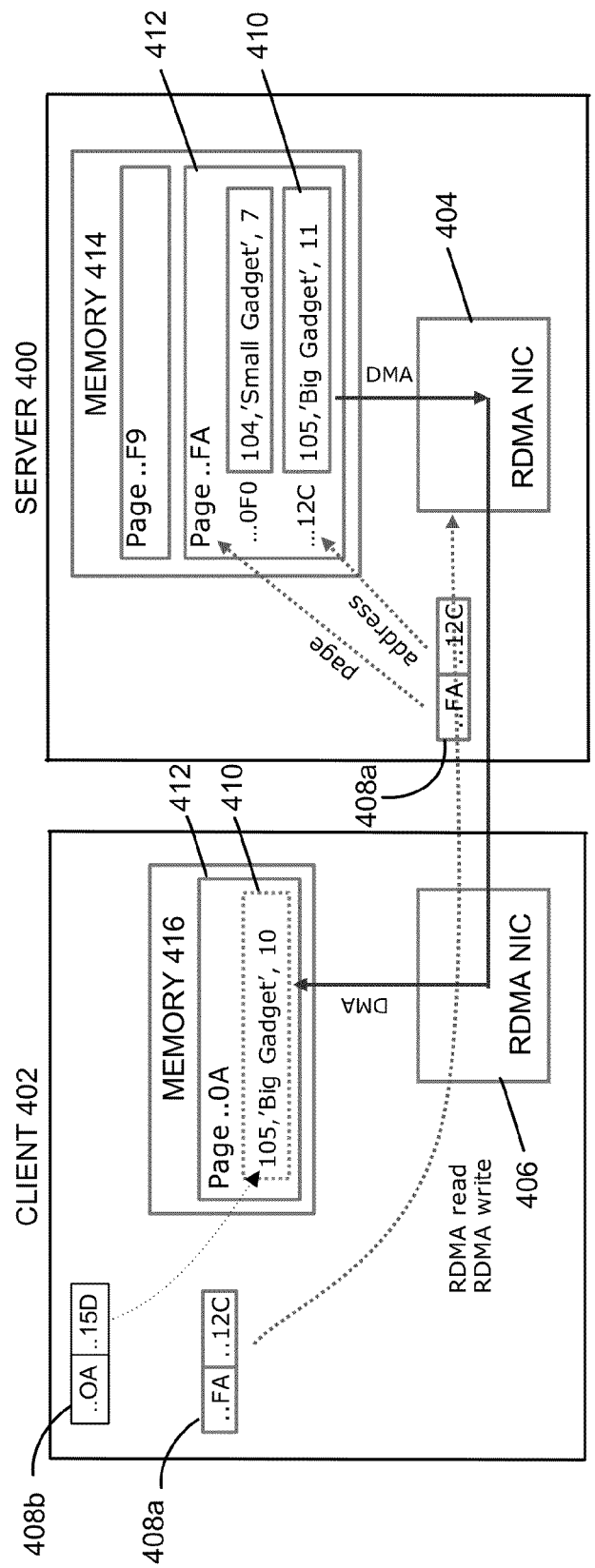
FIG. 4A is a schematic that illustrates a system environment using RDMA for caching, according to at least one embodiment of the present invention.

FIG. 4A is a schematic that illustrates a system environment using RDMA for caching, which includes a Server 400 connected to a Client 402 by means of RDMA NICs 404 and 406, wherein the RDMA NICs 404 and 406 communicate using standard networking protocols. A central concept of RDMA is the use of remote pointers 408a, 408b. The Server 400 exports a server-side remote pointer 408a to the Client 402 that refers to a data record 410 in a pinned and registered page 412 stored in the memory 414 of the Server 400. (The Client 402 may have a client-side remote pointer 408b that refers to a data record 410 in a pinned and registered page 412 stored in the memory 416 of the Client 402, which may or may not be exported to the Server 400.) The records 410 stored in pages 412 in the memory 414 of the Server 400 provide a cache. One-sided RDMA operations allow the Client 402 to directly access (read and overwrite) the record 410 stored in the page 412 in the memory 414 of the Server 400 using the server-side remote pointer 408a.

Specifically, the RDMA NIC 406 of the Client 402 remotely controls the RDMA NIC 404 of the Server 400. A remote pointer 408a is retrieved from the memory 416 of the Client 402. The RDMA NIC 406 then transmits the remote pointer 408a to the RDMA NIC 404 of the Server 400. The RDMA NIC 404 performs DMA (direct memory access) operations transferring records 410 into and out of the memory 414 of the Server 400 as specified by the remote pointer 408a. Similarly, the RDMA NIC 406 of the Client 402 performs DMA operations transferring records 410 into and out of the memory 416 of the Client 402, which may be specified or otherwise associated with the remote pointer 408b.

These RDMA operations do not require execution of any software in the Server 400 or Client 402, and thus there is no CPU involvement and no CPU utilization on the Server 400 or Client 402. Consequently, this results in very fast, near wire-speed, remote access by the Client 402 into and out of the memory 414 of the Server 400 (and similarly, remote access by the Server 400 into and out of the memory 416 of the Client 402). For example, a read or overwrite by the Client 402 of a record 410 stored in the memory 414 of the Server 400 can occur within single-digit microseconds.

Figure 4B:
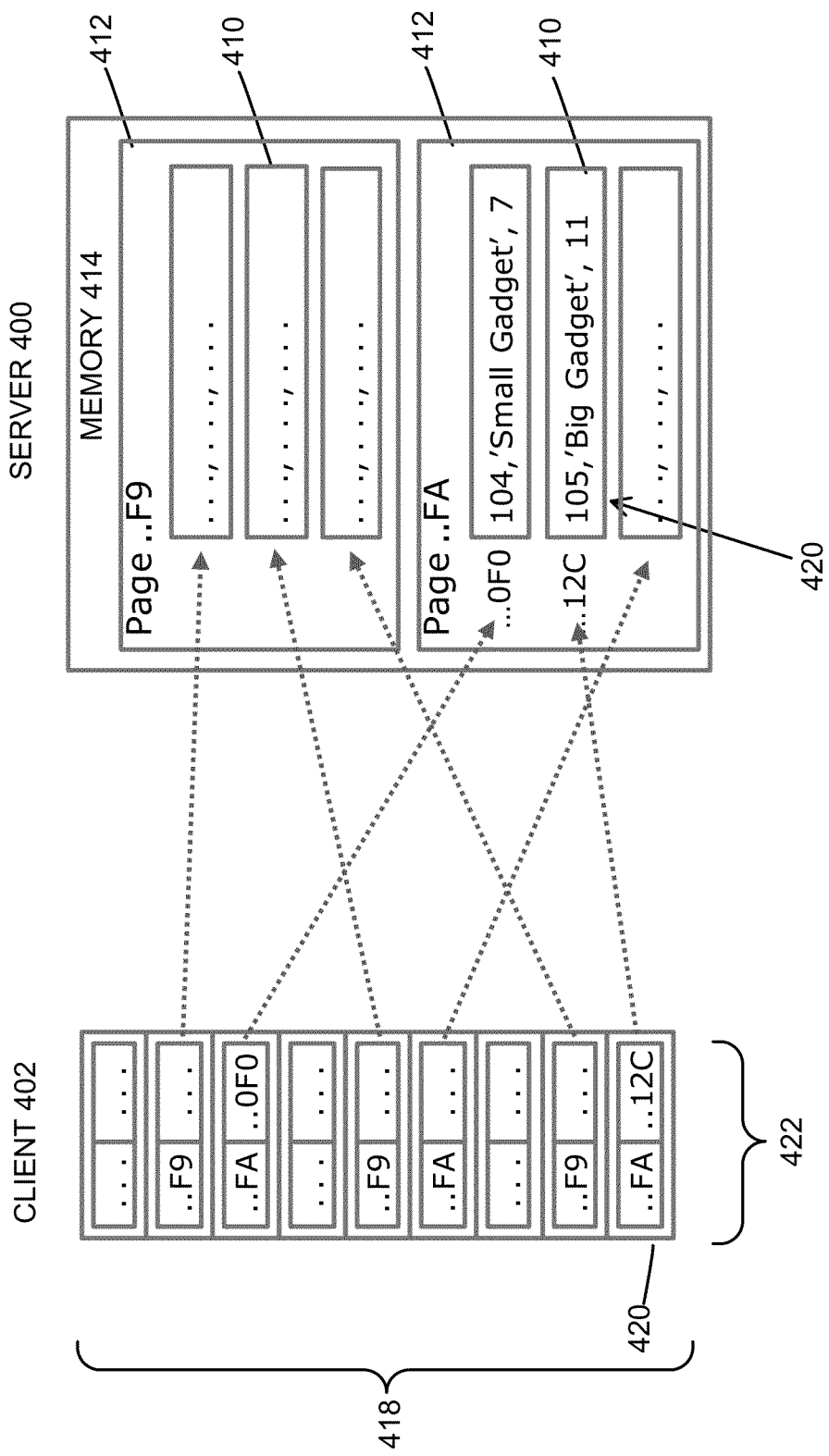
FIG. 4B is a schematic that illustrates a hash map used with RDMA operations, according to at least one embodiment of the present invention.

In one embodiment of the present invention, a hash map 418 is used with the RDMA operations, as shown in FIG. 4B. The Server 400 creates the hash map 418 to store the server-side remote pointers 408a and publishes or exports the hash map 418 to the Client 402. Each entry or slot in the hash map 418 is associated with a key 420 for a record 410 and stores an object-value 422 comprising the server-side remote pointer 408a for the record 410, wherein the key 420 is hashed to select the slot in the hash map 418 for storing the object-value 422.

The size of the hash map 418 is typically only a fraction of the amount of memory 414 allocated for the records 410 and pages 412. For example, the hash map 418 may have a size in the 100s of megabytes (MBs) as compared to the pages 412 in memory 414 allocated for the records 410 that may have a size in the 100s of gigabytes (GBs). The hash map 418 can be kept relatively small by using advanced hashing techniques that substantially reduce collisions (e.g., the hash map 418 does not need to contain the keys 420 for all entries, but only for those slots that have actual collisions).

Figure 4C:
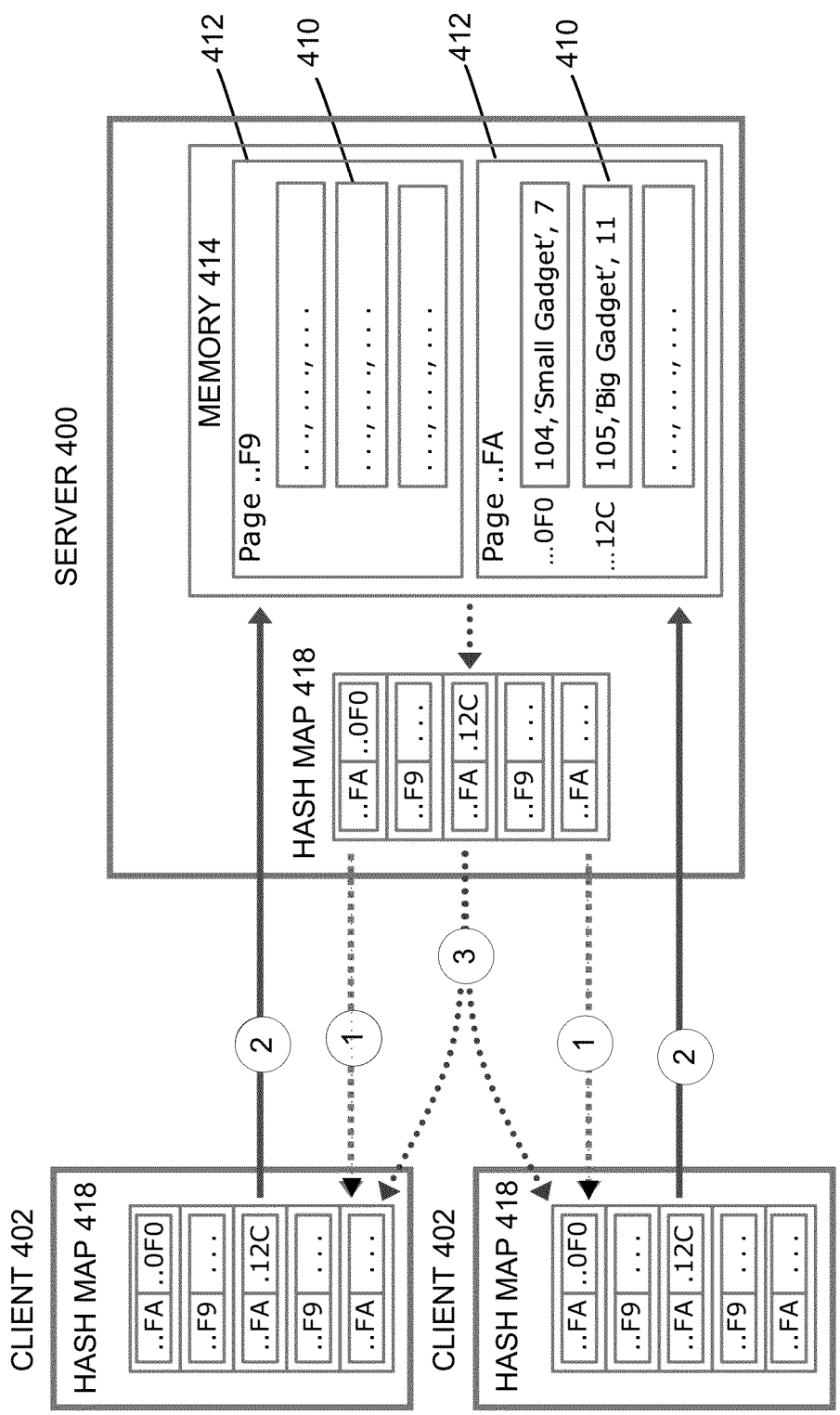
FIG. 4C is a schematic that illustrates a server publishing a hash map to one or more clients at some designated time, according to at least one embodiment of the present invention.

As illustrated in FIG. 4C, the Server 400 publishes the hash map 418 to one or more Clients 402 at some designated time, e.g., at Client 402 startup, at Server 400 startup, when the hash map 418 changes, upon request, at certain intervals, etc., as represented by arrow (1). The Clients 402 can use their copy of the hash map 418 to locally look up server-side remote pointers 408a using the keys 420, in order to perform CRUD (Create, Read, Update, Delete) operations using RDMA on records 410 and pages 412 stored in the memory 414 of the Server 400, as represented by arrow (2). Finally, the Server 400 multicasts full or incremental updates to the hash map 418 to the Clients 402 at some designated time, e.g., when the hash map 418 changes due to creation and deletion operations, as represented by arrows (3).

CRUD Operations

The specifics of the CRUD operations performed using the RDMA-optimized cache of embodiments of the present invention are described in more detail below. As noted previously, the reading and overwriting of records 410 involves no execution of any software in the Server 400, and thus there is no CPU involvement and no CPU utilization on the Server 400. On the other hand, the creation or deletion of records 410 may require execution of software in the Server 400.

Moreover, the creation or deletion of records 410 may also require that a copy of the hash map 418 be maintained on the Server 400, so that the copy of the hash map 418 can be updated when records 410 are created or deleted. Thereafter, the copy of the hash map 418 maintained on the Server 400 can be published again to the Clients 402. Moreover, the Server 400 can perform multicast full or incremental updates to the hash maps 418 maintained on the Clients 402 (which requires only a single server-side RDMA operation).

Create

In a Create (or Insert) operation, the following steps are performed:

The Client 402 allocates and registers a local data structure for a new record 410 in a page 412 in its memory 416. (This can be done once, at startup, and reused for subsequent operations.) Associated with the local data structure, and referencing both the record 410 and page 412, is a client-side remote pointer 408b (i.e., a local pointer to the Client 402).

The Client 402 performs an RDMA-send operation and passes a key 420 from the new record 410 and an object-value 422 comprising the client-side remote pointer 408b for the new record 410 to the Server 400.

The Server 400 allocates and registers a new record 410 in a page 412 in its memory 414. Associated with the new record 410 is the key 420 received from the Client 402 and an object-value 422 comprising a server-side remote pointer 408a (i.e., a local pointer to the Server 400) for the new record 410.

The Server 400 performs a one-sided RDMA-read operation on the Client 402, using the client-side remote pointer 408b as the source and the server-side remote pointer 408a as the target. This results in the data for the new record 410 on the Client 402 being retrieved, and the data then being stored in the new record 410 on the Server 400.

The Server 400 then hashes the key 420 to identify the slot in the hash map 418 and adds the server-side remote pointer 408a to the hash map 418 as the object-value 422.

The Server 400 multicasts (e.g., asynchronously), broadcasts or otherwise exports the new key 420 and object-value 422 (or the entire hash map 418 itself) to the Clients 402, so that the Clients 402 can update their local copies of the hash map 418.

The results of the Create (or Insert) operation include the following:

The cache on the Server 400 includes a new record 410.

The hash maps 418 are updated to reflect the current state of the cache on the Server 400.

The latency of the Create (or Insert) operation is:

Typically 5 µs for the create operation on the Server 400.

An additional 10-15 µs until the Clients 402 have received the new key 420 and value-object 422 or hash map 418.

Read

In a Read operation, the following steps are performed:

The Client 402 allocates and registers a local data structure for a record 410 in a page 412 in its memory 416. (This can be done once, at startup, and reused for subsequent operations.) Associated with the local data structure, and referencing both the record 410 and page 412, is a client-side remote pointer 408b.

The Client 402 hashes the key 420 of the desired record 410 to identify the entry in its copy of the hash map 418 storing the value-object 422 comprising the server-side remote pointer 408a.

The Client 402 performs a one-sided RDMA-read operation on the Server 400, using the server-side remote pointer 408a from the hash map 418 as the source and the client-side remote pointer 408b as the target.

The results of the Read operation include the following:

The record 410 on Server 400 is copied into the record 410 on the Client 402.

The Client 402 can either use the data in its record 410 as-is or copy it somewhere else.

The latency of the Read operation is:

Typically 5-10 µs.

Update

In an Update operation, the following steps are performed:

The Client 402 allocates and registers a local data structure for a record 410 in a page 412 in its memory 416. (This can be done once, at startup, and reused for subsequent operations.) Associated with the local data structure, and referencing both the record 410 and page 412, is a client-side remote pointer 408b.

The Client 402 hashes the key 420 of the desired record 410 to identify the entry in its copy of the hash map 418 storing the value-object 422 comprising the server-side remote pointer 408a.

The Client 402 performs a one-sided RDMA-write operation on the Server 400, using the client-side remote pointer 408b as the source and the server-side remote pointer 408a from the hash map 418 as the target.

The results of the Update operation include the following:

The record 410 on the Client 402 is copied into the record 410 on the Server 400, thereby updating the cache on the Server 400.

The latency of the Update operation is:

Typically 5-10 µs.

Delete

In a Delete operation, the following steps are performed:

The Client 402 allocates and registers a local data structure for a record 410 in a page 412 in its memory 416. (This can be done once, at startup, and reused for subsequent operations.) Associated with the local data structure, and referencing both the record 410 and page 412, is a client-side remote pointer 408b.

The Client 402 sets a "deleted" flag in the record 410.

The Client 402 hashes the key 420 of the desired record 410 to identify the entry in its copy of the hash map 418 storing the value-object 422 comprising the server-side remote pointer 408a.

The Client 402 performs an RDMA-send operation and passes a key 420 for record 410 to be deleted and an object-value 422 comprising the client-side remote pointer 408b for the record 410 to the Server 400.

The Server 400 performs a one-sided RDMA-read operation on the Client 402, using the client-side remote pointer 408b as the source and the server-side remote pointer 408a from the hash map 418 as the target.

The Server 400 multicasts (e.g., asynchronously), broadcasts or otherwise exports the deleted key 420 and object-value 422 (or the entire hash map 418 itself) to the Clients 402, so that the Clients 402 can update their local copies of the hash map 418.

The Server 400 then removes the key 420 and object-value 422, and the data record 410 from the hash map 418.

The results of the Delete operation include the following:

The record 410 on the Client 402 is copied into the record 410 on the Server 400, thereby setting a "deleted" flag in the record 410 on the Server 400.

The latency of the Delete operation is:

Typically 10-15 µs.

Other considerations related to the Delete operation include:

The Server 400 can perform "garbage collection" on its deleted records 410, and then update the hash map 418 to reflect the current state of the cache on the Server 400.

Occasionally, the hash maps 418 have not been updated when a Client 402 performs a read operation on a deleted record 410 in the Server 400. However, this will not break consistency, as the Client 402 should inspect the returned record 410 to determine whether it has been flagged as "deleted." There is extra overhead involved in performing a read operation only to detect that the record 410 has been deleted, but this occasional 5-10 µs overhead is believed to be negligible in the overall scheme.

Hash Map Updates

As noted above, the Server 400 may publish the hash map 418 to one or more Clients 402 at some designated time, e.g., at Client 402 startup, at Server 400 startup, when the hash map 418 changes, upon request, at certain intervals, etc. Moreover, updates to the hash map 418 may be initiated by the Server 400 or the Client 402. For example, such publications or updates may occur in bulk (e.g., the entire hash map 418) or incrementally (e.g., only changed entries in the hash map 418), or using some combination thereof.

In one embodiment, it is envisioned that the Server 400 will publish a complete version of its own hash map 418 to each of the Clients 402 upon connection, and then update the Clients 402 following CREATE and DELETE operations, through the use of incremental multicast operations.

In another embodiment, the Client 402 may start off with an empty hash map 418 and relay "cache misses" to the Server 400 when the key 420 has not been found on its local hash map 418. This embodiment has the following implications:

CREATE events are no longer multicasted to Clients 402.

The size of the local hash map 418 can be tuned to a desired number of entries.

Automatic entry eviction can be implemented on the Client 402 to free up entries in the local hash map 418, although the policy used, such as time-to-live (TTL), least-recently-used (LRU), least-frequently-used (LFU), is application-dependent and may vary from one embodiment of the invention to another.

The cache supports INVALIDATE and FLUSH operations to enable automatic entry eviction.

In other embodiments, any number of different techniques may be used in initially publishing the hash map 418 from the Server 400 to the Client 402, and then subsequently updating the hash map 418 on the Server 400 and the Client 402.

Logical Flow

Figure 5:
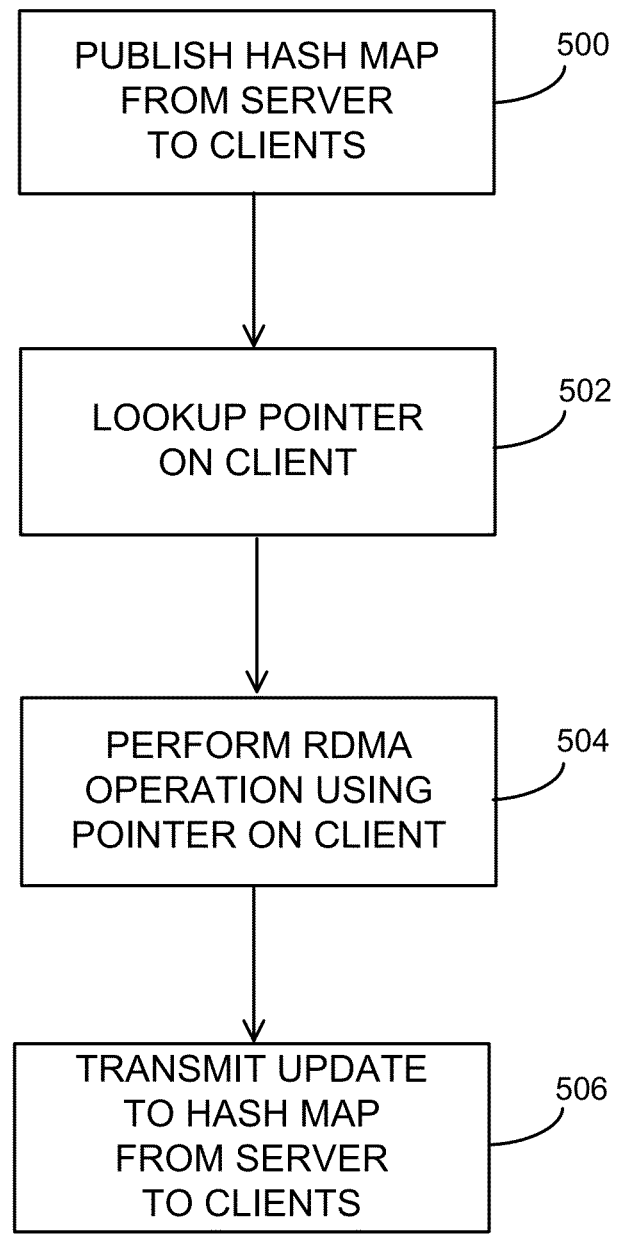
FIG. 5 is a flowchart that illustrates the general steps or functions for using an RDMA-optimized cache by a client to access a data record stored in the cache on a server, according to at least one embodiment of the present invention.

FIG. 5 is a flowchart that illustrates the general steps or functions for RDMA by a Client 402 to a data record 410 stored in a cache on a Server 400, according to one embodiment of the present invention.

Block 500 represents the step or function of publishing the hash map 418 from the Server 400 to one or more Clients 402, wherein the hash map 418 includes one or more entries associated with a key 420 for a data record 410 stored in a cache on the Server 400 and storing a server-side remote pointer 408a that refers to the data record 410 stored in the cache on the Server 400.

Block 502 represents the step or function of looking up the server-side remote pointer 408a for the data record 410 from the hash map 418 on the Client 402 using the key 420.

Block 504 represents the step or function of performing one or more RDMA operations using the server-side remote pointer 408a that allows the Client 402 to directly access the data record 410 stored on the Server 400. The RDMA operations may include: (1) performing a read operation by the Client 402 performing a one-sided RDMA-read operation on the Server 400 using the server-side remote pointer 408a to retrieve the data record 30 from the Server 400; (2) performing an update operation by the Client 402 performing a one-sided RDMA-write operation on the Server using the server-side remote pointer 408a to copy the data record 410 to the Server 400; (3) performing a delete operation by setting a "deleted" flag for the data record 410 on the Client 402 and the Client 402 performing a one-sided RDMA-write operation on the Server 400 using the server-side remote pointer 408a to copy the data record 410 to the Server 400; or (4) performing an insert operation by the Client 402 creating the data record 410, the key 420 for the data record 410, and a client-side remote pointer 408b to the data record 410 stored on the Client, the Client 402 performing a send operation to the Server 400 and passing the key 420 and the client-side remote pointer 408b to the data record 410 stored on the Client 402, the Server 400 allocating a memory structure for the data record 410 and creating a server-side remote pointer 408a for the data record 410, the Server 400 performing a one-sided RDMA-read on the Client 402 using the client-side remote pointer 408b to retrieve the data record 410 from the Client 402, the Server 400 adding the key 420 for the data record 410 and the server-side remote pointer 408a for the data record 410 to the hash map 418, and the Server 400 transmitting the hash map 418 to some or all of the Clients 402.

Block 506 represents the step or function of transmitting an update to the hash map 418 from the Server 400 to some or all of the Clients 402.

Experimental Results

An implementation of the RDMA-optimized cache has proven the worth of embodiments of the present invention as an ultra-performance key-value pair cache. There were 12 clients accessing a single server having 10 million cache entries, of 1 KB each, for a 10 GB total. The CRUD mix was 10% create, 60% read, 20% update, and 10% delete. The implementation provided an average of 8.5 microseconds access latency (wherein create had a 11 µs, retrieve was 5 µs, update was 4 µs, and delete was 10 µs access latency), with over 1.25 million requests per second throughput per individual server.

Figure 6:
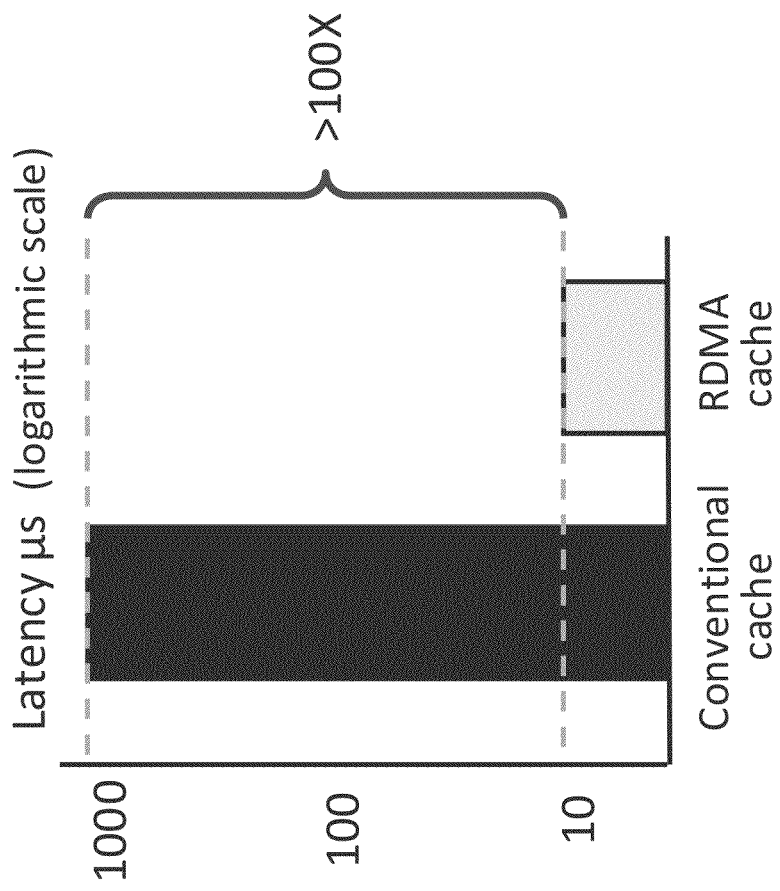
FIG. 6 is a bar chart illustrating the differences in latency between a conventional cache and an RDMA-optimized cache.

As shown in the bar chart of FIG. 6, the average 8.5 microseconds access latency is significantly better than the millisecond access latencies for conventional caches. Indeed, embodiments of the present invention can improve performance beyond 100×.

Figure 7:
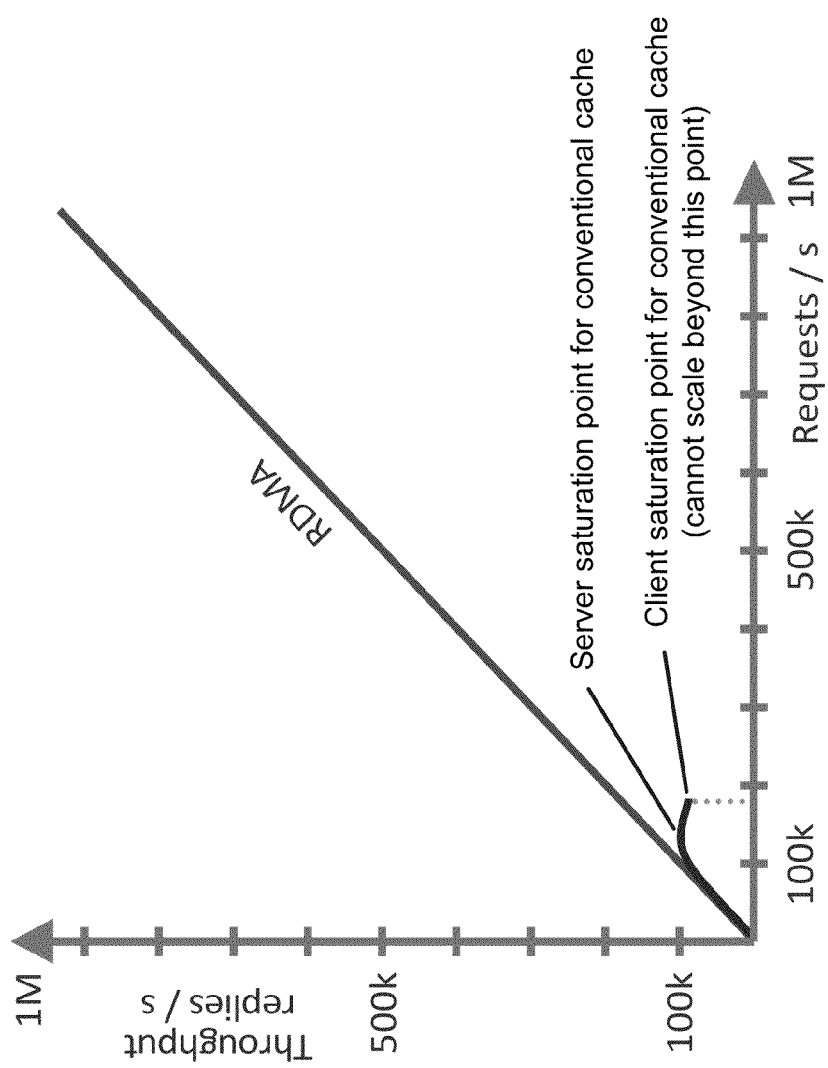
FIG. 7 is a graph of requests per second vs. throughput replies per second for both an RDMA-optimized cache and a conventional cache.

As shown in the graph of FIG. 7, the RDMA-optimized cache shows a linear load curve with a saturation point well over 1M requests per seconds. In contrast, a conventional cache requires that a CPU do work for every single request, which results in a load curve that is not linear, wherein the server reaches a saturation point early at about 100 k requests per second with a corresponding client starvation point, beyond which the application cannot scale.

Consequently, the advantages presented by embodiments of this invention are substantial because of the significant improvement in performance over prior art techniques, resulting in increased throughput and reduced latency.

CONCLUSION

This concludes the detailed description of the invention. The following describes some alternative embodiments for accomplishing the present invention.

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

For example, any type of computer, such as a mainframe, minicomputer, or personal computer, could be used with and for embodiments of the present invention. In addition, many types of applications other than caching applications could benefit from the present invention. Specifically, any application that performs remote access may benefit from the present invention.

Herein, the term "by" should be understood to be inclusive. That is, when reference is made to performing A by performing X and Y, it should be understood this may include performing A by performing X, Y and Z.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for remote direct memory access (RDMA) by a client computer to a data record stored in a cache on a server computer, comprising:
   a client computer for accessing one or more data records stored in a cache in a memory of a server computer;
   the client computer receiving a hash map from the server computer for locally storing on the client computer, wherein the hash map includes one or more key-value pairs, such that one or more entries of the hash-map is associated with a key for a data record stored in the cache in the memory of the server computer, each of the entries of the hash-map stores a value comprising a server-side remote pointer, and the server-side remote pointer references the data record stored in the cache in the memory of the server;
   the client computer looking up the server-side remote pointer for the data record from the hash map locally stored on the client computer using the key; and
   the client computer performing one or more RDMA operations using the server-side remote pointer via an RDMA network interface controller that allows the client computer to remotely directly access the data record stored in the memory of the server computer without involving software performed by the server computer.

2. The apparatus of claim 1, further comprising the client computer receiving an update to the hash map from the server computer.

3. The apparatus of claim 1, wherein the client computer performing the one or more RDMA operations further comprises the client computer performing a read operation by:
   the client computer performing a one-sided RDMA-read operation on the server computer using the server-side remote pointer to retrieve the data record from the server computer.

4. The apparatus of claim 1, wherein the client computer performing the one or more RDMA operations further comprises the client computer performing an update operation by:
   the client computer performing a one-sided RDMA-write operation on the server computer using the server-side remote pointer to copy the data record to the server computer.

5. The apparatus of claim 1, wherein the client computer performing the one or more RDMA operations further comprises the client computer performing a delete operation by:
   the client computer creating the data record, the key for the data record, and a client-side remote pointer to the data record stored on the client computer;
   the client computer setting a delete flag in the data record stored on the client computer;
   the client computer identifying the server-side remote pointer for the data record stored on the server computer;
   the client computer performing a send operation to the server computer and passing the key, the client-side remote pointer to the data record stored on the client computer and the server-side remote pointer to the data record stored on the server computer;
   the client data record being accessed by a one-sided RDMA-read of the server computer using the client-side remote pointer to retrieve the data record from the client computer and the server-side remote pointer for providing a copy of the data record to the server computer; and
   the hash map being updated on the client computer to remove the key and the data record from the hash map.

6. The apparatus of claim 1, wherein the client computer performing the one or more RDMA operations further comprises the client computer performing an insert operation by:
   the client computer creating the data record, the key for the data record, and a client-side remote pointer to the data record stored on the client computer;
   the client computer performing a send operation to the server computer and passing the key and the client-side remote pointer to the data record stored on the client computer and the server-side remote pointer for the data record stored in an allocated memory structure on the server computer;
   the client data record being accessed by a one-sided RDMA-read of the server computer using the client-side remote pointer to retrieve the data record from the client computer;
   the hash map being updated on the client computer to add the key for the data record and the server-side remote pointer for the data record to the hash map.

7. A computer program product for remote direct memory access (RDMA) by a client computer to a data record stored in a cache in a memory of a server computer, said computer program product comprising:
   a non-transitory computer readable storage medium having stored/encoded thereon:
   program instructions executable by a server computer to cause the server computer to publish a hash map from the server computer to a client computer for locally storing on the client computer, wherein the hash map includes one or more key-value pairs, such that one or more entries of the hash-map is associated with a key for a data record stored in a cache in the memory of the server computer, each of the entries of the hash-map stores a value comprising a server-side remote pointer, and the server-side remote pointer references the data record stored in the cache in the memory of the server computer;
   the client computer looking up the server-side remote pointer for the data record from the hash map locally stored on the client computer using the key; and
   the client computer performing one or more RDMA operations using the server-side remote pointer via an RDMA network interface controller that allows the client computer to remotely directly access the data record stored in the memory of the server computer without involving software performed by the server computer.

8. The computer program product of claim 7, further comprising program instructions executable by the server computer to cause the server computer to transmit an update to the hash map from the server computer to the client computer.

9. The computer program product of claim 7, wherein the client computer performing the RDMA operation further comprises the client computer performing a read operation by:
   the server computer being accessed by a one-sided RDMA-read operation by the client computer using the server-side remote pointer to retrieve the data record from the server computer.

10. The computer program product of claim 7, wherein the client computer performing the RDMA operation further comprises the client computer performing an update operation by:
   the server computer being accessed by a one-sided RDMA-write operation by the client computer using the server-side remote pointer to copy the data record to the server computer.

11. The computer program product of claim 7, wherein the client computer performing the RDMA operation further comprises the client computer performing a delete operation by:
- the server computer receiving a key for a data record stored on the client computer, a client-side remote pointer to the data record stored on the client computer and the server-side remote pointer to the data record stored on the server computer, wherein the data record stored on the client computer includes a delete flag;
- the server computer performing a one-sided RDMA-read on the client computer using the client-side remote pointer to retrieve the data record from the client computer and the server-side remote pointer for providing a copy of the data record to the server computer;
- the hash map being updated on the client computer; and
- the server computer removing the key and the data record from the hash map.

12. The computer program product of claim 7, wherein the client computer performing the RDMA operation further comprises the client computer performing an insert operation by:
- the server computer receiving a key for a data record created by the client computer and a client-side remote pointer to the data record stored on the client computer;
- the server computer allocating a memory structure for the data record and creating a server-side remote pointer for the data record;
- the server computer performing a one-sided RDMA-read on the client computer using the client-side remote pointer to retrieve the data record from the client computer;
- the server computer adding the key for the data record and the server-side remote pointer for the data record to the hash map; and
- the hash map being updated on the client computer.

* * * * *